(12) United States Patent
Nakamura et al.

(10) Patent No.: US 12,247,135 B2
(45) Date of Patent: Mar. 11, 2025

(54) FILM, LIQUID COMPOSITION, OPTICAL ELEMENT, AND IMAGING APPARATUS

(71) Applicant: Nippon Sheet Glass Company, Limited, Tokyo (JP)

(72) Inventors: Koichiro Nakamura, Kanagawa (JP); Satoru Kusaka, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/635,574

(22) Filed: Apr. 15, 2024

(65) Prior Publication Data

US 2024/0271004 A1 Aug. 15, 2024

Related U.S. Application Data

(63) Continuation of application No. 16/969,478, filed as application No. PCT/JP2018/041533 on Nov. 8, 2018, now Pat. No. 11,987,722.

(30) Foreign Application Priority Data

Feb. 13, 2018 (JP) .................................. 2018-023182
Nov. 7, 2018 (JP) .................................. 2018-209453

(51) Int. Cl.
  *C09D 183/04* (2006.01)
  *C08K 7/24* (2006.01)
  (Continued)

(52) U.S. Cl.
  CPC ............. *C09D 183/04* (2013.01); *C09D 7/61* (2018.01); *G02B 1/111* (2013.01); *G02B 1/118* (2013.01);
  (Continued)

(58) Field of Classification Search
  CPC ......... C09B 183/04; C09D 7/61; G02B 1/111; G02B 1/118
  (Continued)

(56) References Cited

U.S. PATENT DOCUMENTS

2003/0099844 A1  5/2003  Hanahata et al.
2007/0196667 A1  8/2007  Asai
(Continued)

FOREIGN PATENT DOCUMENTS

CN  102702966  10/2012
CN  103739206  4/2014
(Continued)

OTHER PUBLICATIONS

International Search Report and Written Opinion issued for International Patent Application No. PCT/JP2018/041533, Date of mailing: Dec. 11, 2018, 8 pages including English translation of Search Report.

(Continued)

*Primary Examiner* — Jerry L Brooks
(74) *Attorney, Agent, or Firm* — HSML P.C.

(57) ABSTRACT

A film (1) includes hollow particles (10) and a binder (20). The hollow particles are made of a material having a refractive index of 1.15 to 2.70. The binder (20) is formed of at least a polysilsesquioxane and binds the hollow particles (10). The film (1) satisfies at least one of requirements Ib/Ia≥0.7 and Ib/Ic≥0.3. Ia is an absorbance derived from a hydrocarbon group not directly bonded to a silicon atom, the absorbance being determined by attenuated total reflection using a Fourier transform infrared spectrophotometer. Ib is an absorbance derived from a bond between a silicon atom and a non-reactive functional group. Ic is an absorbance derived from a bond between a silicon atom and a hydroxy group.

18 Claims, 9 Drawing Sheets

(51) Int. Cl.
  *C09D 7/61* (2018.01)
  *G02B 1/111* (2015.01)
  *G02B 1/118* (2015.01)

(52) U.S. Cl.
  CPC .......... *C08K 7/24* (2013.01); *C08K 2201/003* (2013.01); *C08K 2201/011* (2013.01)

(58) Field of Classification Search
  USPC ........................................................ 359/614
  See application file for complete search history.

(56) References Cited

U.S. PATENT DOCUMENTS

| | | |
|---|---|---|
| 2014/0284747 A1 | 9/2014 | Takakuwa et al. |
| 2015/0132554 A1 | 5/2015 | Yamaguchi |
| 2015/0175809 A1 | 6/2015 | Cho et al. |
| 2015/0274983 A1 | 10/2015 | Cho et al. |
| 2015/0323706 A1 | 11/2015 | Yang et al. |
| 2017/0243989 A1 | 8/2017 | Koyo et al. |
| 2017/0261648 A1 | 9/2017 | Leclaire |
| 2017/0269264 A1 | 9/2017 | Makino et al. |

FOREIGN PATENT DOCUMENTS

| | | | | |
|---|---|---|---|---|
| JP | 2005172896 | | 6/2005 | |
| JP | 2013246433 | | 12/2013 | |
| JP | 2014063125 | * | 4/2014 | ........... C09D 183/04 |
| JP | 2015094885 A | | 5/2015 | |
| JP | 2015534104 | | 11/2015 | |
| JP | 2015535617 | | 12/2015 | |
| JP | 2015536477 | | 12/2015 | |
| JP | 20170167271 | | 9/2017 | |
| WO | 2016051750 | | 4/2016 | |

OTHER PUBLICATIONS

Extended European Search Report issued for European Patent Application No. 18906029.6, dated Sep. 30, 2021, 7 pages.

* cited by examiner

FILM, LIQUID COMPOSITION, OPTICAL ELEMENT, AND IMAGING APPARATUS

TECHNICAL FIELD

The present invention relates to a film and a liquid composition advantageous for low refractive index coating. The present invention also relates to an optical element and an imaging apparatus.

BACKGROUND ART

Performing coating (low refractive index coating) using a low refractive index material for preventing reflection and a composition for low refractive index coating have been known.

For example, Patent Literatures 1 and 2 each describe an antireflection coating composition. The coating composition includes: a binder formed by polymerization of a given silane compound and a fluoroalkyl group-including organosilane compound; and hollow silica particles. Patent Literatures 1 and 2 each also describe an antireflection film including a low refractive index layer formed by coating a surface of a substrate with the coating composition.

Patent Literature 3 describes an antireflection film having a laminate structure composed of a transparent substrate, a high-refraction layer, and a low-refraction layer. The low-refraction layer includes: a binder formed by polymerization of a given silane compound and a fluoroalkyl group-including organosilane compound; and hollow silica particles.

Patent Literature 4 describes an optical member including an antireflection film and a method for producing the optical member. The production method includes a step of applying a dispersion containing particles and a dispersion medium onto a substrate. The production method further includes a step of applying a solution containing a component for forming a binder after the step of applying the dispersion to let the solution infiltrate a space between the particles contained in the dispersion applied beforehand and form a single layer including the binder filling the space between the particles. The production method further includes a step of drying the layer to produce an antireflection film. The solution contains a silane alkoxy condensate having an average particle diameter of 8 nm or more and 60 nm or less and 70 mass % or more of a solvent having a solubility in water of 10 wt % or less.

CITATION LIST

Patent Literature

Patent Literature 1: JP 2015-534104 A
Patent Literature 2: JP 2015-536477 A
Patent Literature 3: JP 2015-535617 A
Patent Literature 4: JP 2017-167271 A

SUMMARY OF INVENTION

Technical Problem

The techniques in Patent Literatures 1 to 3 requires a fluoroalkyl group-including organosilane compound. In the technique in Patent Literature 4, the solution containing the silane alkoxy condensate needs to infiltrate the space between the particles contained in the dispersion applied beforehand, and the method for producing an optical member is complicated. Therefore, the present invention provides a film not requiring a fluoroalkyl group-including organosilane compound and advantageous for low refractive index coating. The present invention also provides a liquid composition not requiring a fluoroalkyl group-including organosilane compound and used to perform low refractive index coating in a simple manner.

Solution to Problem

The present invention provides a film including:
hollow particles made of a material having a refractive index of 1.15 to 2.70; and
a binder formed of at least a polysilsesquioxane and binding the hollow particles, wherein
at least one of requirements $Ib/Ia \geq 0.7$ and $Ib/Ic \geq 0.3$ are satisfied when an absorbance derived from a hydrocarbon group not directly bonded to a silicon atom, an absorbance derived from a bond between a silicon atom and a non-reactive functional group, and an absorbance derived from a bond between a silicon atom and a hydroxy group are respectively expressed as Ia, Ib, and Ic, the absorbances being determined by attenuated total reflection (ATR) using a Fourier transform infrared spectrophotometer.

The present invention also provides a liquid composition including:
hollow particles made of a material having a refractive index of 1.15 to 2.70;
a polysilsesquioxane; and
a solvent, wherein
in a hardened product obtained by applying the liquid composition to a substrate and hardening the liquid composition, at least one of requirements $Ib/Ia \geq 0.7$ and $Ib/Ic \geq 0.3$ are satisfied when an absorbance derived from a hydrocarbon group not directly bonded to a silicon atom, an absorbance derived from a bond between a silicon atom and a non-reactive functional group, and an absorbance derived from a bond between a silicon atom and a hydroxy group are respectively expressed as Ia, Ib, and Ic, the absorbances being determined by attenuated total reflection using a Fourier transform infrared spectrophotometer.

The present invention also provides an optical element including the above film.

The present invention also provides an imaging apparatus including the above optical element.

Advantageous Effects of Invention

The above film does not require a fluoroalkyl group-including organosilane compound and is advantageous for low refractive index coating. The above liquid composition does not require a fluoroalkyl group-including organosilane compound. Additionally, low refractive index coating can be performed in a simple manner using the above liquid composition.

DESCRIPTION OF EMBODIMENTS

The techniques in Patent Literatures 1 to 3 requires a fluoroalkyl group-including organosilane compound. Therefore, the present inventors thought that when a coating liquid contains water as a solvent (dispersion medium) in the techniques described in Patent Literatures 1 to 3, the water repellency of the fluoroalkyl group causes phase separation in the coating liquid. Therefore, the present inventors thought that in the techniques of Patent Literatures 1 to 3, an additive such as a surfactant needs to be added to obtain a homogeneous coating liquid. Additionally, the present inventors thought that in the techniques described in Patent Literatures 1 to 3, the water repellency and oil repellency of the fluoroalkyl group decrease the wettability of the coating liquid on a hydrophilic glass substrate and a hydrophobic (lipophilic) resin substrate and makes it likely that the substrates repels the coating liquid applied thereto. Moreover, the present inventors thought that the technique described in Patent Literature 4 requires complicated steps. Specifically, a solution containing a silane alkoxy condensate needs to infiltrate a space between particles after a dispersion containing the particles are applied. Therefore, the present inventors conducted intensive studies to develop a film not requiring a fluoroalkyl group-including organosilane compound and advantageous for low refractive index coating. As a result, the present inventors have invented the film according to the present invention. The present inventors have also invented a liquid composition not requiring a fluoroalkyl group-including organosilane compound and used to perform low refractive index coating easily.

Hereinafter, embodiments of the present invention will be described with reference to the drawings. The following description is directed to some examples of the present invention, and the present invention is not limited by these examples.

Figure 1:
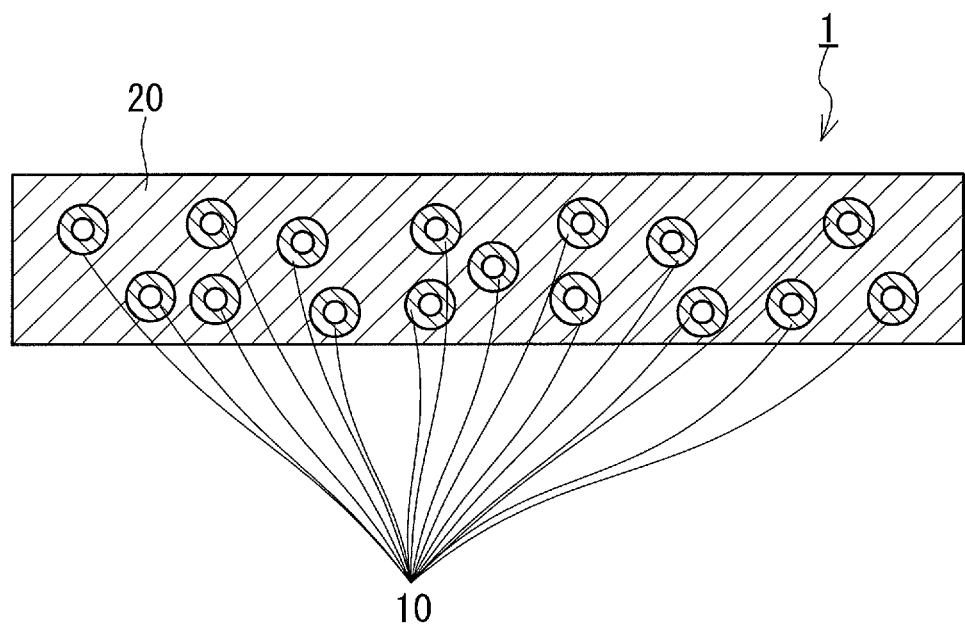
FIG. 1 is a cross-sectional view schematically showing a structure of an example of a film according to the present invention.

As shown in FIG. 1, a film 1 includes hollow particles 10 and a binder 20. The hollow particles 10 are made of a material having a refractive index of 1.15 to 2.70. The binder 20 is formed of at least a polysilsesquioxane and binds the hollow particles 10. For the film 1, an absorbance derived from a hydrocarbon group not directly bonded to a silicon atom, an absorbance derived from a bond between a silicon atom and a non-reactive functional group, and an absorbance derived from a bond between a silicon atom and a hydroxy group are respectively expressed as Ia, Ib, and Ic, the absorbances being determined by attenuated total reflection (ATR) using a Fourier transform infrared spectrophotometer. The film 1 satisfies at least one of requirements $Ib/Ia \geq 0.7$ and $Ib/Ic \geq 0.3$. Herein, $Ib/Ia$ is also called an organic-inorganic parameter (D) and $Ib/Ic$ is also called a hydrophobicity parameter (H). The absorbance Ia, the absorbance Ib, and the absorbance Ic can be determined, for example, according to methods described in EXAMPLES from an absorption spectrum obtained by ATR.

The smaller the amount of the hydrocarbon group included in the binder 20 and not directly bonded to a silicon atom is, the greater the organic-inorganic parameter (D) is. When the amount of the hydrocarbon group included in the binder 20 and not directly bonded to a silicon atom is small, a Si—O—Si network in the binder 20 is dense and the density of an inorganic component in the binder 20 is high. As a result, the hollow particles 10 are fixed firmly by the Si—O—Si network. Therefore, in the case of $Ib/Ia \geq 0.7$ in the film 1, the hollow particles 10 are fixed firmly in the film 1 and the film 1 has properties advantageous for low refractive index coating. If the hollow particles are not sufficiently firmly fixed in the film, the mechanical strength of the film may decrease.

The smaller the amount of the hydroxy group bonded to a silicon atom is in the binder 20, the greater the hydrophobicity parameter (H) increases. For example, the amount of the hydroxy group bonded to a silicon atom in the binder 20 decreases as the Si—O—Si network develops in the precursor of the binder 20 by condensation of the hydroxy groups. The hydrophobicity parameter (H) equal to or more than the given value indicates development of a dense Si—O—Si network, which can firmly fix the hollow particles 10. Therefore, in the case of $Ib/Ic \geq 0.3$ in the film 1, the hollow particles 10 are fixed firmly in the film 1 and the film 1 has properties advantageous for low refractive index coating.

The film 1 desirably further satisfies the requirements $Ib/Ia \geq 0.7$ and $Ib/Ic \geq 0.3$. In this case, the hollow particles 10 are more reliably fixed firmly in the film 1 and the film 1 has properties advantageous for low refractive index coating.

When there is a silanol group (Si—OH) in the binder 20, the silanol group forms a hydrogen bond with a silanol group on a surface of a glass substrate and thus has a high affinity for the glass substrate. Therefore, the film having a hydrophobicity parameter (H) equal to or less than a given value is likely to adhere to a glass substrate. The film 1 more desirably satisfies a requirement $0.3 \leq Ib/Ic \leq 2.0$ so as to exhibit a good adherability to both a substrate having a hydrophilic surface and a substrate having a hydrophobic surface.

For the film 1, a first absorbance, a second absorbance, and a third absorbance derived from a bond between one oxygen atom and two silicon atoms and determined by ATR are respectively expressed as Id, Ie, and If. The first absorbance Id corresponds to a first wavenumber. The second absorbance Ie corresponds to a second wavenumber greater than the first wavenumber. The third absorbance If corresponds to a third wavenumber greater than the second wavenumber. The film 1 desirably satisfies at least one of requirements Id/Ib≤60, Ie/Ib≤20, and If/Ib≤174. Herein, Id/Ib is also called a first network parameter (Ni), Ie/Ib is also called a second network parameter (N2), and If/Ib is also called a third network parameter (N3).

The first wavenumber is, for example, a wavenumber at which the local maximum of an absorption spectrum in the range of 455±50 cm$^{-1}$ appears. The second wavenumber is, for example, a wavenumber at which the local maximum of an absorption spectrum in the range of 780±50 cm$^{-1}$ appears. The third wavenumber is, for example, a wavenumber at which the local maximum of an absorption spectrum in the range of 1065±50 cm$^{-1}$ appears.

The more bonds (Si—O—Si) between one oxygen atom and two silicon atoms there are in the binder 20, the greater the first network parameter (N1), the second network parameter (N2), and the third network parameter (N3) increase. The first network parameter (N1), the second network parameter (N2), and the third network parameter (N3) increase as the Si—O—Si network resulting from condensation of the hydroxy groups develops in the precursor of the binder 20. In the meantime, in terms of ensuring good film formation capability, it is important to reduce aggregation of the hollow particles and maintain a uniform thickness of a coating film. An excessive development of the Si—O—Si network is desirably prevented in order to reduce aggregation of the hollow particles. From this viewpoint, at least one of N1=60 or less, N2=20 or less, and N3=174 or less is desirably satisfied in the film 1. In this case, the film 1 can be formed successfully and an antireflection structure having good antireflection performance by virtue of the film 1 can be provided.

The film 1 more desirably further satisfies the requirements Id/Ib≤60, Ie/Ib≤20, and If/Ib≤174.

The polysilsesquioxane in the binder 20 typically has the non-reactive functional group bonded to a silicon atom. The non-reactive functional group is, for example, a hydrophobic functional group such as an alkyl group so that the polysilsesquioxane in the binder 20 will exert an appropriate hydrophobic effect. The polysilsesquioxane in the binder 20 is desirably a polysilsesquioxane in which a hydrocarbon group including 16 or less carbon atoms is bonded as the non-reactive functional group to a silicon atom. In this case, the non-reactive functional group is small in volume, and thus a dense Si—O—Si network is likely to be formed.

The binder 20 may further be formed of, for example, silica. In this case, the polysilsesquioxane included in the binder 20 is likely to exert a hydrophobic effect while the silica included in the binder 20 is likely to exert a hydrophilic effect. Therefore, the hydrophilicity or the hydrophobicity of the film 1 can be adjusted to an appropriate level by adjusting the ratio (Mp/Ms) of the amount of substance Mp of the polysilsesquioxane to the amount of substance Ms of silica in the binder 20. This allows the film 1 to be appropriately formed on a substrate having a hydrophilic surface, such as a glass substrate, and on a substrate having a hydrophobic surface, such as a resin substrate. From this viewpoint, the ratio (Mp/Ms) of the amount of substance Mp of the polysilsesquioxane to the amount of substance Ms of silica is, for example, 3/7 or more, desirably 1 to 9, and more desirably 3/2 to 4 in the binder 20.

The hollow particles 10 are not particularly limited as long as the hollow particles 10 have a hollow structure. The hollow particles 10 have the shape of, for example, a sphere, a tube, or a sheet. The hollow particles 10 have an average particle diameter (primary particle diameter) of, for example, 10 to 150 nm. Because of this, the hollow particles 10 are likely to be dispersed uniformly in the film 1. The average particle diameter of the hollow particles 10 can be determined, for example, by calculating the arithmetic mean of the particle diameters of 50 or more hollow particles 10 observed using a transmission electron microscope (TEM) or a scanning electron microscope (SEM). The particle diameters of the particles refer to the maximum diameters.

The hollow particles 10 desirably have an average diameter of 20 to 100 nm and more desirably have an average particle diameter of 30 to 70 nm. The maximum dimension of the internal space of each of the hollow particles 10 is, for example, 5 to 100 nm, desirably 10 to 70 nm, and more desirably 20 to 50 nm. The hollow particles 10 are desirably monodisperse particles having a coefficient of variation of 0.1 or less.

The material of the hollow particles 10 may be an inorganic material or an organic material as long as the material has a refractive index of 1.15 to 2.70. The material of the hollow particles 10 is desirably a material having a refractive index of 1.20 to 2.00, more desirably a material having a refractive index of 1.30 to 1.50, and even more desirably a material having a refractive index of 1.38 to 1.46. The hollow particles 10 are desirably made of an inorganic material in view of high deformation resistance to external force. In this case, the hollow particles 10 are made of, for example, at least one selected from the group consisting of silica, magnesium fluoride, alumina, aluminosilicate, titania, and zirconia.

Among these, the hollow particles 10 are desirably made of silica or magnesium fluoride in order to provide an antireflection structure having high antireflection performance by low refractive index coating using the film 1. Silica has a refractive index of 1.46 while magnesium fluoride has a refractive index of 1.38.

The structure and the material of the hollow particles 10 are determined so that the hollow particles 10 will have a desired refractive index. For example, the material of the hollow particles 10 and the ratio of the internal space of each of the hollow particles 10 to the whole volume of each of the hollow particles 10 are determined so that the hollow particles 10 will have a desired refractive index. The hollow particles 10 have a refractive index of, for example, 1.10 to 1.40, desirably have a refractive index of 1.20 to 1.35, and more desirably have a refractive index of 1.25 to 1.30. For example, when hollow particles made of different materials having different refractive indices have the same ratio of the internal space of a hollow particle to the whole volume of the hollow particle, a hollow particle made of a lower refractive index material have a lower refractive index than a hollow particle made of a higher refractive index material.

The refractive index of the hollow particles 10 can be measured, for example, by an immersion method (Becke line method). For example, when the hollow particles 10 are made of silica, the refractive index of the hollow particles 10 can be measured according to the following procedure:
  (i) evaporating and drying a dispersion medium in a dispersion of the hollow particles 10 to obtain a powder;
  (ii) mixing the powder obtained in (i) with various standard refractive index liquids, such as those of Series A and Series AA manufactured by Cargill Laboratories, having different refractive indices; and (iii) determining the refractive index of a standard refractive index liquid as the refractive index of the hollow particles 10, the standard refractive index liquid being employed in (ii) to obtain a clear liquid mixture.

The hollow particles 10 may be commercially-available or may be produced by a given method. For example, the hollow particles 10 may be produced by forming a shell around a core and removing the core. For example, a shell made of silica or magnesium fluoride is formed around a polymer core having a particle diameter of a several tens of nanometers. The polymer core is then removed by dissolving the core in a solvent or burning the core. The hollow particles 10 which are hollow silica particles or hollow magnesium fluoride particles can thus be obtained. The hollow particles 10 which are hollow magnesium fluoride particles can be obtained also by forming a shell made of magnesium fluoride around a core made of silica and dissolving the core made of silica with an alkali.

In the film 1, the ratio (Wh/Wb) of the mass Wh of the hollow particles 10 to the mass Wb of the binder 20 is, for example, 1/5 to 20, desirably 1/3 to 10, and more desirably 1 to 5. In this case, an antireflection structure having high antireflection performance can be provided by low refractive index coating using the film 1.

The thickness of the film 1 is not particularly limited, and is determined, for example, in consideration of a wavelength range of light reflection of which should be prevented. Specifically, the thickness of the film 1 is specified so that the optical thickness (refractive index×physical thickness) will satisfy $\lambda/4$, where the center wavelength of the wavelength range of light reflection of which should be prevented is $\lambda$ (nm). For example, to prevent reflection of light in the visible region (practically, the wavelength range of 380 nm to 780 nm), the best physical thickness is 115 nm in the case where a which is the center wavelength is 550 nm and the refractive index of a low refractive index film used is 1.20. The practically effective thickness of the film 1 for preventing reflection of visible light is 50 to 300 nm, desirably 70 to 200 nm, and more desirably 90 to 170 nm. In this case, an antireflection structure having high antireflection performance can be provided by low refractive index coating using the film 1. To prevent reflection of light with a center wavelength of $\lambda=850$ nm and in a wavelength range which is in the near-infrared region (e.g., the wavelength range of 800 nm to 2500 nm) and close to the visible region, the best physical thickness is 177 nm in the case where the refractive index of a low refractive index film used is 1.20. The practically effective thickness of the film 1 for preventing reflection of near-infrared light is 80 to 350 nm, desirably 130 to 250 nm, and more desirably 150 to 220 nm. In this case, an antireflection structure having high antireflection performance can be provided by low refractive index coating using the film 1. When a multilayer film is used as an antireflection structure, a low refractive index layer having a thickness of 50 nm or less may be included therein. The physical thickness of the low refractive index film is not limited to these and can be measured at a cross-section thereof, for example, with a SEM, a TEM, or an ellipsometer.

The film 1 has a refractive index of, for example, 1.35 or less. In this case, an antireflection structure having high antireflection performance can be provided by low refractive index coating using the film 1. The film 1 desirably has a refractive index of 1.30 or less, and more desirably has a refractive index of 1.25 or less. The film 1 may include an air space in a space between the hollow particles 10 or in the binder 20 in view of decreasing the refractive index of the film 1. The refractive index of the film 1 can be determined, for example, by reflectance spectroscopy.

The film 1 is, for example, a hardened product obtained by hardening a given liquid composition. This liquid composition includes hollow particles, a polysilsesquioxane, and a solvent. The hollow particles are made of a material having a refractive index of 1.15 to 2.70. In the hardened product obtained by applying the liquid composition to a substrate and hardening the liquid composition, at least one of requirements Ib/Ia≥0.7 and Ib/Ic≥0.3 is satisfied. The solvent contained in the liquid composition is, for example, an alcohol such as ethanol or water.

Since this liquid composition does not require a fluoroalkyl group-including organosilane compound, phase separation is unlikely to occur in the liquid composition and the liquid composition is likely to be homogeneous. Additionally, the wettability of the liquid composition on a glass substrate and a resin substrate is high, and the film 1 having a uniform structure is likely to be obtained with the liquid composition.

In the above hardened product, the requirements Ib/Ia≥0.7 and Ib/Ic≥0.3 are desirably further satisfied.

In the above hardened product, at least one of requirements Id/Ib≤60, Ie/Ib≤20, and If/Ib≤174 is desirably satisfied.

In the above hardened product, the requirements Id/Ib≤60, Ie/Ib≤20, and If/Ib≤174 are more desirably further satisfied.

The polysilsesquioxane in the liquid composition is, for example, a polysilsesquioxane in which a hydrocarbon group including 16 or less carbon atoms is bonded as the non-reactive functional group to a silicon atom.

The characteristics of the hollow particles 10 in the film 1 are typically applicable to the hollow particles in the liquid composition. Thus, the hollow particles in the liquid composition have an average particle diameter (primary particle diameter) of, for example, 10 to 150 nm. The hollow particles in the liquid composition are desirably made of at least one selected from the group consisting of silica, magnesium fluoride, alumina, aluminosilicate, titania, and zirconia.

The liquid composition may include, for example, silica in addition to the hollow particles.

Figure 2:
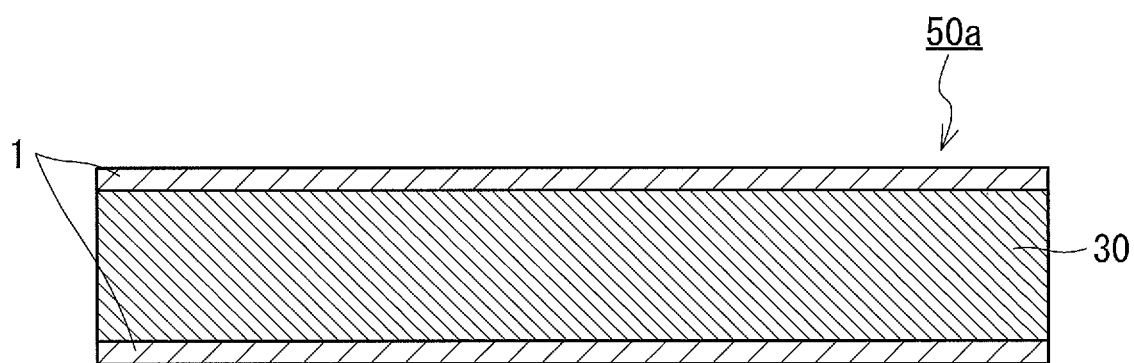
FIG. 2 is a cross-sectional view showing an example of an antireflection structure for which low refractive index coating has been performed using the film according to the present invention.

As shown in FIG. 2, the film 1 is formed, for example, by applying the liquid composition to a principal surface of a substrate 30 and hardening the liquid composition. An antireflection structure 50a for which low refractive index coating has been performed using the film 1 is thus provided. With the use of the liquid composition, low refractive index coating can be performed in a simple manner without requiring a fluoroalkyl group-including organosilane compound.

The polysilsesquioxane in the liquid composition is formed, for example, by hydrolysis and dehydration condensation of a trifunctional alkoxysilane included in the raw materials of the liquid composition. When silica is included in the liquid composition in addition to the hollow particles, this silica is formed, for example, by hydrolysis and dehydration condensation of a tetrafunctional alkoxysilane included in the raw materials of the liquid composition. For example, the tetrafunctional alkoxysilane forms silica ($SiO_2$) by reactions represented by the following (Equation 1) and (Equation 2). $R_a$ represents an alkyl group. The trifunctional alkoxysilane forms the polysilsesquioxane ($R_bSiO_{3/2}$) by reactions represented by the following (Equation 3) and (Equation 4). $R_b$ represents the non-reactive functional group, and $R_c$ represents an alkyl group.

$$Si(OR_a)_4 + 4H_2O \longrightarrow Si(OH)_4 + 4R_aOH \quad \text{(Equation 1)}$$

$$Si(OH)_4 \longrightarrow SiO_2 + 2H_2O \quad \text{(Equation 2)}$$

$$R_bSi(OR_c)_3 + 3H_2O \longrightarrow R_bSi(OH)_3 + 3R_cOH \quad \text{(Equation 3)}$$

$$R_bSi(OR_c)_3 \longrightarrow R_bSiO_{3/2} + 3/2H_2O \quad \text{(Equation 4)}$$

A hydrolysis catalyst included in the raw materials of the liquid composition is, for example, a carboxylic acid such as a formic acid or an acetic acid.

The substrate 30 is, for example, made of glass or resin.

The liquid composition can be hardened, for example, by heating a coating film formed by applying the liquid composition to a principal surface of the substrate 30. In this case, the coating film is typically heated by exposure to an environment having a temperature less than a temperature (decomposition temperature) at which the trifunctional alkoxysilane is thermally decomposed. The coating film is desirably heated by exposure to an environment having a temperature less than 450° C. When the substrate 30 is made of a resin having low heat resistance, the coating film may be heated, for example, by exposure to an environment having a temperature of 100° C. or less. A refractive index of 1.35 or less (e.g., 1.20) can be imparted to the film 1 also by heating the coating film by exposure to an environment, for example, at 80° C.

The ratio (Mp/Ms) of the amount of substance Mp of the polysilsesquioxane to the amount of substance Ms of silica in the binder 20 of the film 1 can be considered, for example, equal to the ratio (Mr/Me) of the amount of substance Mr of the trifunctional alkoxysilane included in the raw materials of the liquid composition to the amount of substance Me of the tetrafunctional alkoxysilane included in the raw materials of the liquid composition.

The film 1 is formed on both principal surfaces of the substrate 30 in the antireflection structure 50a. The film 1 may be formed on only one principal surface of the substrate 30. When the film 1 is formed on both principal surfaces of the substrate 30, the refractive index and the thickness of the film 1 formed on one of the principal surfaces may be the same as or different from those of the film 1 formed on the other principal surface. For example, the film 1 formed on one principal surface may be configured to prevent reflection of light in the visible region and the film 1 formed on the other principal surface may be configured to prevent reflection of light in a wavelength range which is in the near-infrared region and close to the visible region.

The antireflection structure 50a can be modified in various respects. For example, the antireflection structure 50a may be modified so as to have any of the following laminate structures (I) to (IV). "A/B" refers to a laminate in which B is in contact with A. "(A/B)m" or "(A/B)n" refers to m or n repetitions of a structure including B laminated on A. m is an integer of 2 or more, and n is an integer of 1 or more. In the following laminate structures, a low refractive index layer has a refractive index of 1.5 or less and a thickness of, for example, 30 to 300 nm. The film 1 forms at least one low refractive index layer in each of the following laminate structures. The low refractive index layer can be a layer made of silica or magnesium fluoride. A medium refractive index layer has a refractive index of more than 1.5 and 1.8 or less and a thickness of, for example, 30 to 300 nm. The medium refractive index layer is, for example, a layer made of alumina or a mixture of silica and titania. A high refractive index layer has a refractive index of more than 1.8 and a thickness of, for example, 30 to 300 nm. The high refractive index layer is a layer made of, for example, titania, zirconia, tantalum oxide, or niobium oxide. These laminate structures may be formed on only one principal surface of a substrate or may be formed on both principal surfaces of a substrate.

Figure 3A:
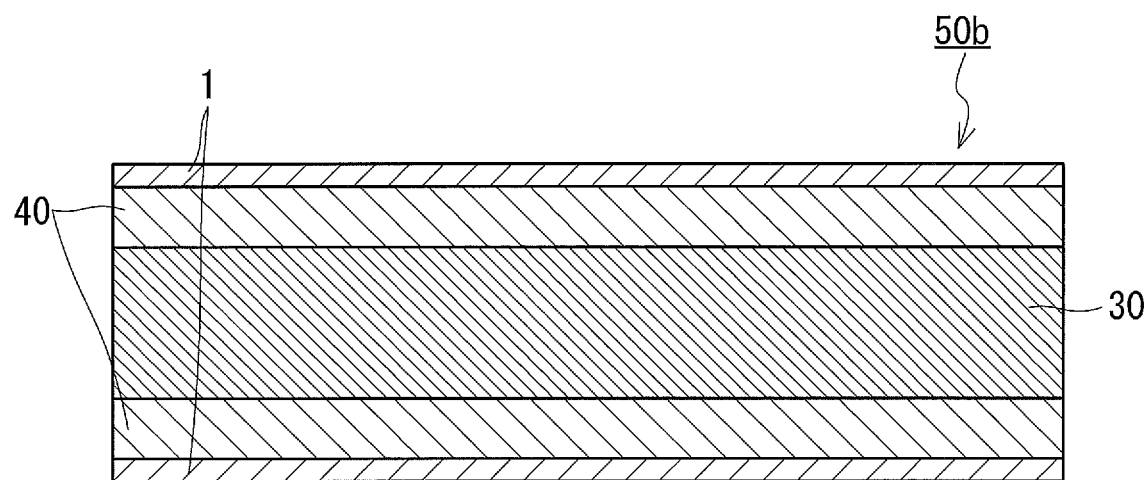
FIG. 3A is a cross-sectional view showing an example of another antireflection structure for which low refractive index coating has been performed using the film according to the present invention.

(I) Substrate/high refractive index layer/low refractive index layer (II) Substrate/medium refractive index layer/high refractive index layer/low refractive index layer (III) Substrate/(high refractive index layer/low refractive index layer)m (IV) Substrate/low refractive index layer/(high refractive index layer/low refractive index layer)n The antireflection structure 50a may be modified to an antireflection structure 50b as shown in FIG. 3A. Between the film 1 and the substrate 30 in the thickness direction of the substrate 30, the antireflection structure 50b includes a low refractive index layer (a second low refractive index layer 40) which is different from a low refractive index layer (a first low refractive index layer) formed of the film 1. The second low refractive index layer 40 has a refractive index of 1.5 or less and a thickness of, for example, 30 to 300 nm. The second low refractive index layer 40 is, for example, a layer not including the hollow particles 10 and made of at least one of a polysilsesquioxane and silica. The film 1 and the second low refractive index layer 40 are formed on both principal surfaces of the substrate 30 in the antireflection structure 50b. The film 1 and the second low refractive index layer 40 may be formed on only one principal surface of the substrate 30.

Figure 3B:
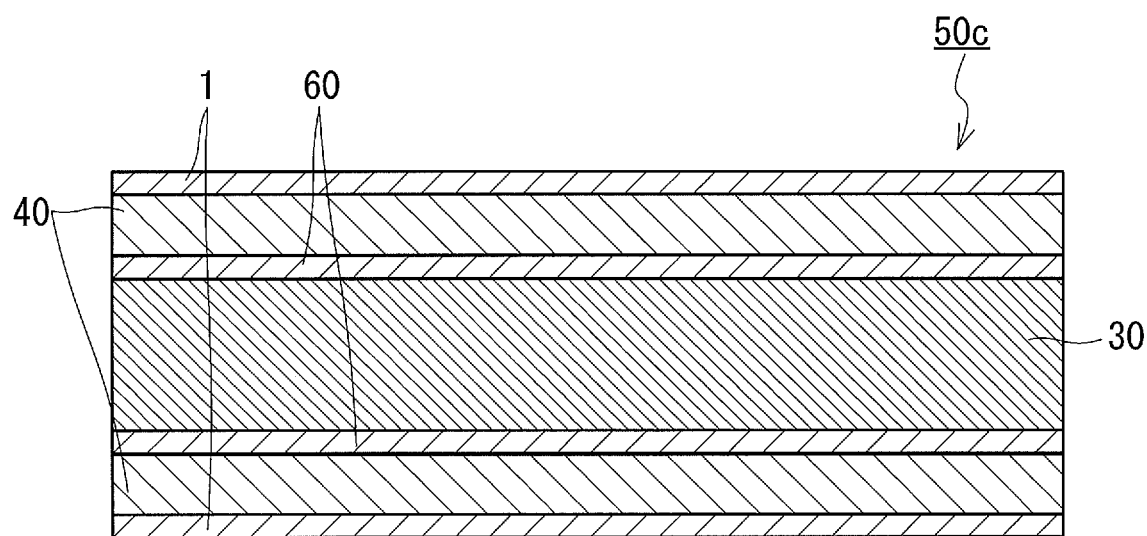
FIG. 3B is a cross-sectional view showing an example of yet another antireflection structure for which low refractive index coating has been performed using the film according to the present invention.

The antireflection structure 50a may be modified to an antireflection structure 50c as shown in FIG. 3B. Between the film 1 and the substrate 30 in the thickness direction of the substrate 30, the antireflection structure 50c includes a plurality of low refractive index layers (the second low refractive index layer 40 and a third low refractive index layer 60) which are different from the low refractive index layer (the first low refractive index layer) formed of the film 1. The second low refractive index layer 40 has a refractive index of 1.5 or less and a thickness of, for example, 30 to 300 nm. The second low refractive index layer 40 is, for example, a layer not including the hollow particles 10 and made of at least one of a polysilsesquioxane and silica. The third low refractive index layer 60 has a refractive index of 1.5 or less and a thickness of, for example, 30 to 300 nm. The third low refractive index layer 60 may have the same refractive index and thickness as those of the first low refractive index layer. The film 1, the second low refractive index layer 40, and the third low refractive index layer 60 are formed on both principal surfaces of the substrate 30. The film 1, the second low refractive index layer 40, and the third low refractive index layer 60 may be formed on only one principal surface of the substrate 30.

For example, an optical element including the film 1 can be provided. The optical element including the film 1 can be, for example, an optical filter such as a low-pass filter or an infrared (IR) cut filter, a lens, or a cover glass. The film 1 is, for example, formed by applying the above liquid composition to a surface of an optical element such as a lens and drying the liquid composition, and functions as a low refractive index coating. By virtue of the film 1, the optical element can prevent reflection of light with a given wavelength, for example, visible light. The optical element may further include a dielectric multilayer film for preventing reflection, or may not include a dielectric multilayer film for preventing reflection. The optical element including the film 1 and not including a dielectric multilayer film for preventing reflection is advantageous in view of reducing production cost and preventing reflection of light with a given wavelength.

For example, an imaging apparatus including the above optical element can be provided. This imaging apparatus is, for example, a camera module for personal information terminals such as smartphones or a digital camera.

Figure 4A:
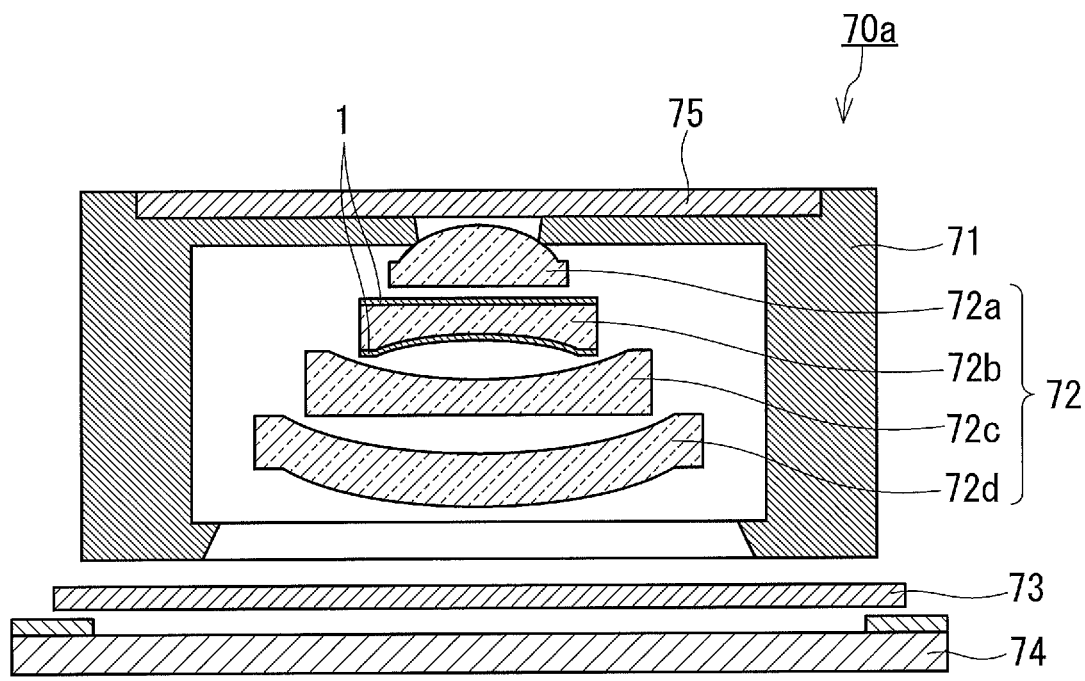
FIG. 4A is a cross-sectional view showing an example of an imaging apparatus according to the present invention.

As shown in FIG. 4A, an imaging apparatus 70a includes, for example, a housing 71, a lens system 72, a filter system 73, a solid-state imaging sensor 74, and a cover 75. The imaging apparatus 70a is, for example, a camera module for personal information terminals such as smartphones. FIG. 4A is a diagram schematically showing the imaging apparatus 70a and does not necessarily describe the shapes and dimensions of parts in a real apparatus and relative positions of the parts in a real apparatus correctly. Additionally, the imaging apparatus 70a can typically include an additional component such as an adjustment mechanism for the lens system 72 or a diaphragm. These components are omitted from FIG. 4A for convenience of description.

The lens system 72 is disposed inside the housing 71. The lens system 72 includes one single lens or a plurality of single lenses (four single lenses 72a, 72b, 72c, and 72d in FIG. 4A). The material of the single lens is typically glass or resin. An optical filter included in the filter system 73 is not particularly limited. The filter system 73 can include, for example, at least one of a low-pass filter or an IR cut filter. The housing 71 has, for example, an opening formed around an optical axis of the lens system 72. The opening is covered by the cover 75. The cover 75 is desirably made of glass. The cover 75 can withstand collision with an object outside the housing 71 and a variation in environmental conditions for the imaging apparatus 70a.

Figure 4B:
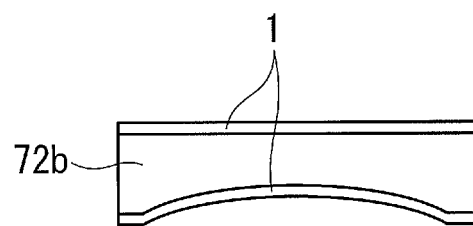
FIG. 4B is a side view showing a single lens shown in FIG. 4A.

As shown in FIG. 4A and FIG. 4B, for example, at least one of the single lenses included in the lens system 72 includes the film 1 in the imaging apparatus 70a. When the single lens includes the film 1, the film 1 may be disposed on only one surface of the single lens, or may be disposed on both surfaces of the single lens. For example, the single lens 72b includes the film 1. When the lens system 72 includes the plurality of single lenses, which single lens the film 1 should be formed on is determined as appropriate. Although not illustrated, the lens system 72 may include a cemented lens configured by cementing the plurality of single lenses together. The film 1 may be disposed on only one surface or on both surfaces of the cemented lens. The film 1 is typically formed by applying and drying the above liquid composition. Therefore, when the single lens has a surface having a small curvature radius, the lens has a steep surface and the above liquid composition applied to form the film 1 can flow to cause a special variation in the thickness of the film 1. Adjustment of the conditions for applying and drying the above liquid composition can reduce the special variation in the thickness of the film 1.

Figure 5A:
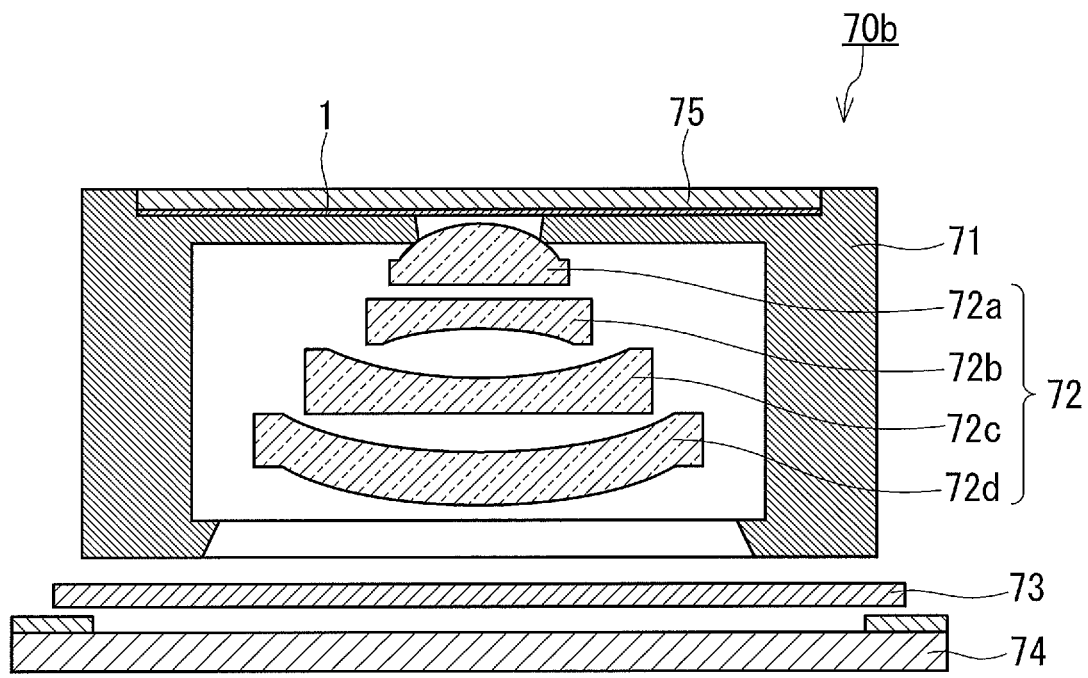
FIG. 5A is a cross-sectional view showing another example of the imaging apparatus according to the present invention.

The imaging apparatus 70a may be modified to an imaging apparatus 70b as shown in FIG. 5A. The imaging apparatus 70b is configured in the same manner as for the imaging apparatus 70a, unless otherwise described. The components of the imaging apparatus 70b that are the same as or correspond to those of the imaging apparatus 70a are denoted by the same reference characters, and detailed descriptions of such components are omitted. The description given for the imaging apparatus 70a is applicable to the imaging apparatus 70b, unless there is technical inconsistency.

Figure 5B:
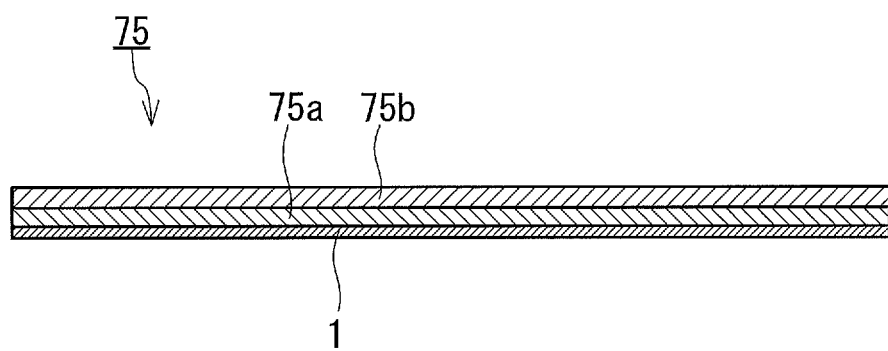
FIG. 5B is a cross-sectional view showing an example of a cover of an imaging apparatus.

As shown in FIG. 5A, in the imaging apparatus 70b, for example, the cover 75 includes the film 1. For example, the film 1 is formed on one principal surface of a glass sheet 75a of the cover 75. For example, the cover 75 is disposed so that the film 1 faces the inside of the housing 71. Deterioration and separation of the film 1 can thus be prevented. As shown in FIG. 5B, a dielectric multilayer film 75b which is an antireflection film may be formed on the other principal surface of the glass sheet 75a of the cover 75.

In the imaging apparatuses 70a and 70b, at least one optical filter included in the filter system 73 may include the film 1. In this case, the film 1 may be omitted from the single lens of the lens system 72 of the imaging apparatus 70a and the cover 75 of the imaging apparatus 70b. In the filter system 73, the optical filter including the film 1 may be a low-pass filter or an IR cut filter. The film 1 is disposed on a surface of the optical filter. By virtue of the IR cut filter, a spectrum of light capable of being received by the solid-state imaging sensor 74 including a semiconductor can be approximated to a visual sensitivity curve (spectrum) of humans. The IR cut filter has, for example, a function of cutting off (blocking) at least infrared light having a wavelength of 700 to 1000 nm.

Figure 6:
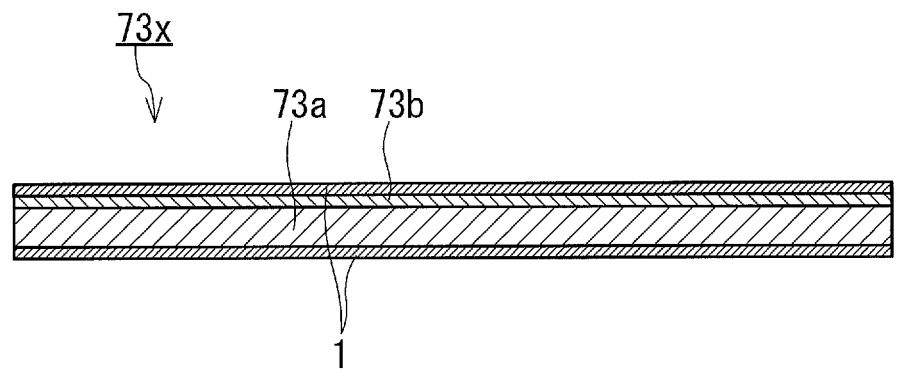
FIG. 6 is a cross-sectional view showing an example of an IR cut filter of an imaging apparatus.

The IR cut filter included in the filter system 73 includes, for example, an infrared-absorbing glass, an infrared reflecting film formed of a dielectric multilayer film, an infrared absorbing film, or a combination thereof. The infrared-absorbing glass is a glass including, for example, copper phosphate or copper fluorophosphate. The infrared absorbing film is a film in which an infrared absorbing dye or pigment is dispersed in a matrix resin. For example, the IR cut filter as described above can include the film 1. For example, the filter system 73 includes an IR cut filter 73x as shown in FIG. 6. The IR cut filter 73x includes, for example, an infrared-absorbing glass 73a, an infrared absorbing film 73b, and a pair of the films 1. The infrared-absorbing glass 73b has the shape of a plate or a sheet. The infrared absorbing film 73b is formed on one principal surface of the infrared-absorbing glass 73a. The pair of films 1 are formed so as to be both principal surfaces of the IR cut filter 73x.

Figure 7:
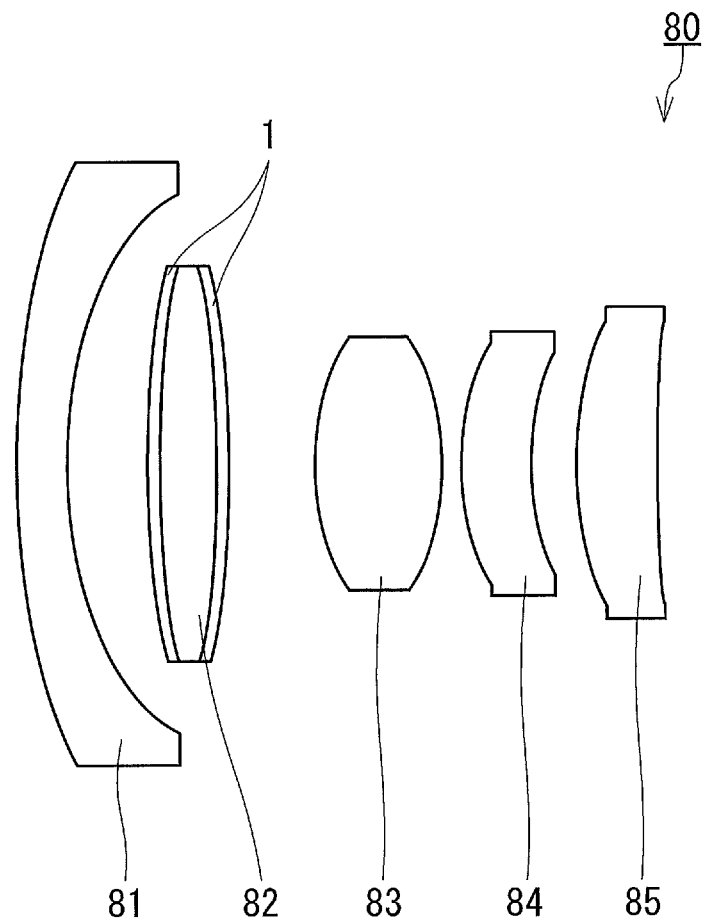
FIG. 7 is a side view showing an optical system in yet another example of the imaging apparatus according to the present invention.

The imaging apparatus including the above optical element can be an imaging apparatus, such as a digital camera (a digital still camera or a digital movie camera), other than a camera module for personal information terminals such as smartphones. The imaging apparatus may include, for example, an optical system 80 as shown in FIG. 7. FIG. 7 does not necessarily describe the shapes and dimensions of parts in a real apparatus and relative positions of the parts in a real apparatus correctly. The optical system 80 includes, for example, a plurality of single lenses 81, 82, 83, 84, and 85. For example, the film 1 is formed on both surfaces of the single lens 82. Although not illustrated, the optical system 80 may include a cemented lens configured by cementing a plurality of single lenses together. The film 1 may be disposed on only one surface or on both surfaces of the cemented lens.

In the imaging apparatus 70a, the imaging apparatus 70b, and the optical system 80, the lens system may be configured by combining a lens including the film 1 and a lens including an antireflection film formed of a dielectric multilayer film or an antireflection structure having a moth-eye structure.

EXAMPLES

The present invention will be described in more detail by examples. The present invention is not limited to the examples given below. First, methods for evaluating antireflection structures according to Examples and Comparative Example and low refractive index films according to Examples and Comparative Example will be described.

[Analysis by ATR]

Figure 8:
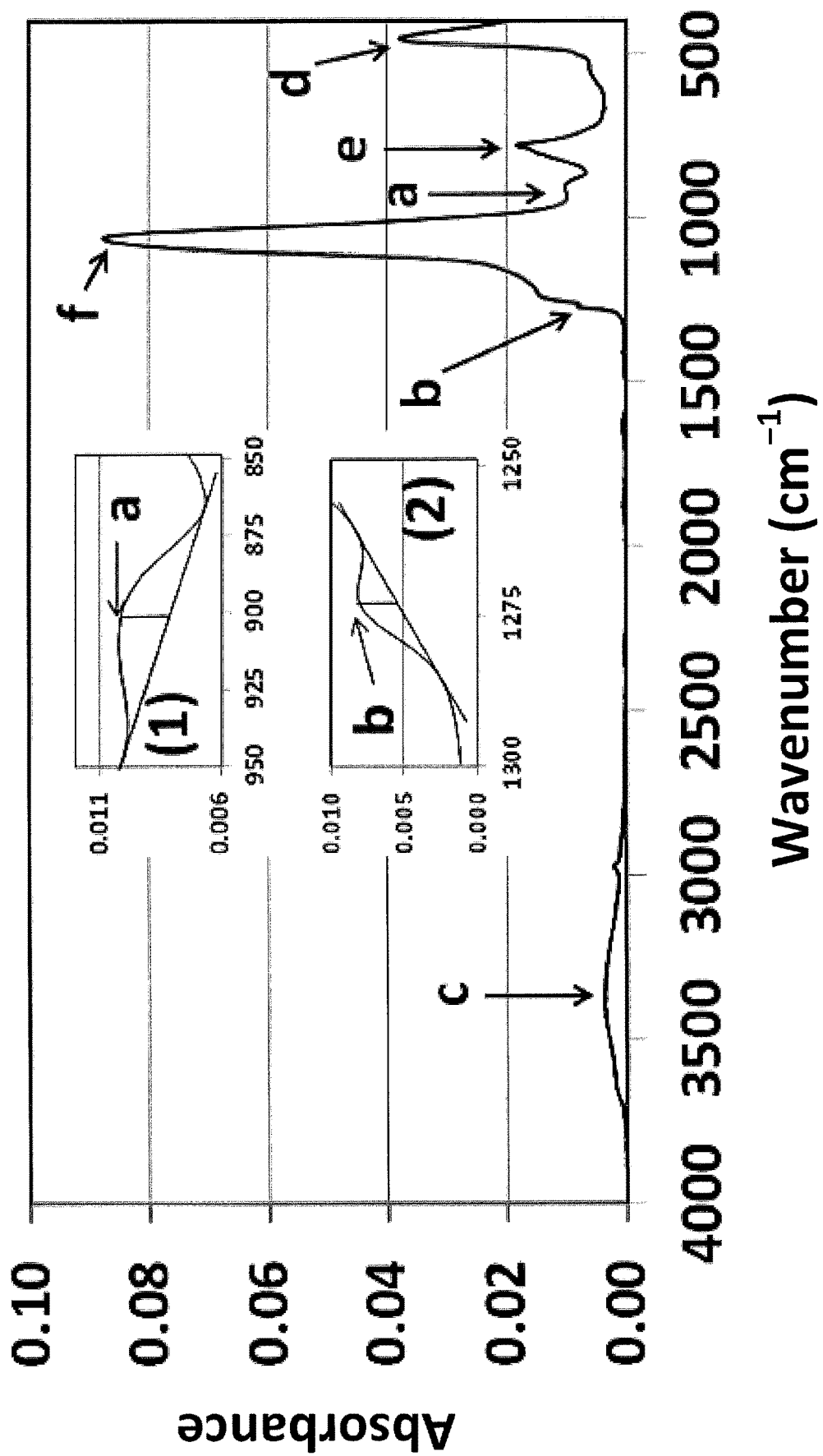
FIG. 8 is a graph showing an absorption spectrum obtained by ATR for a film according to Example 1.
Figure 9:
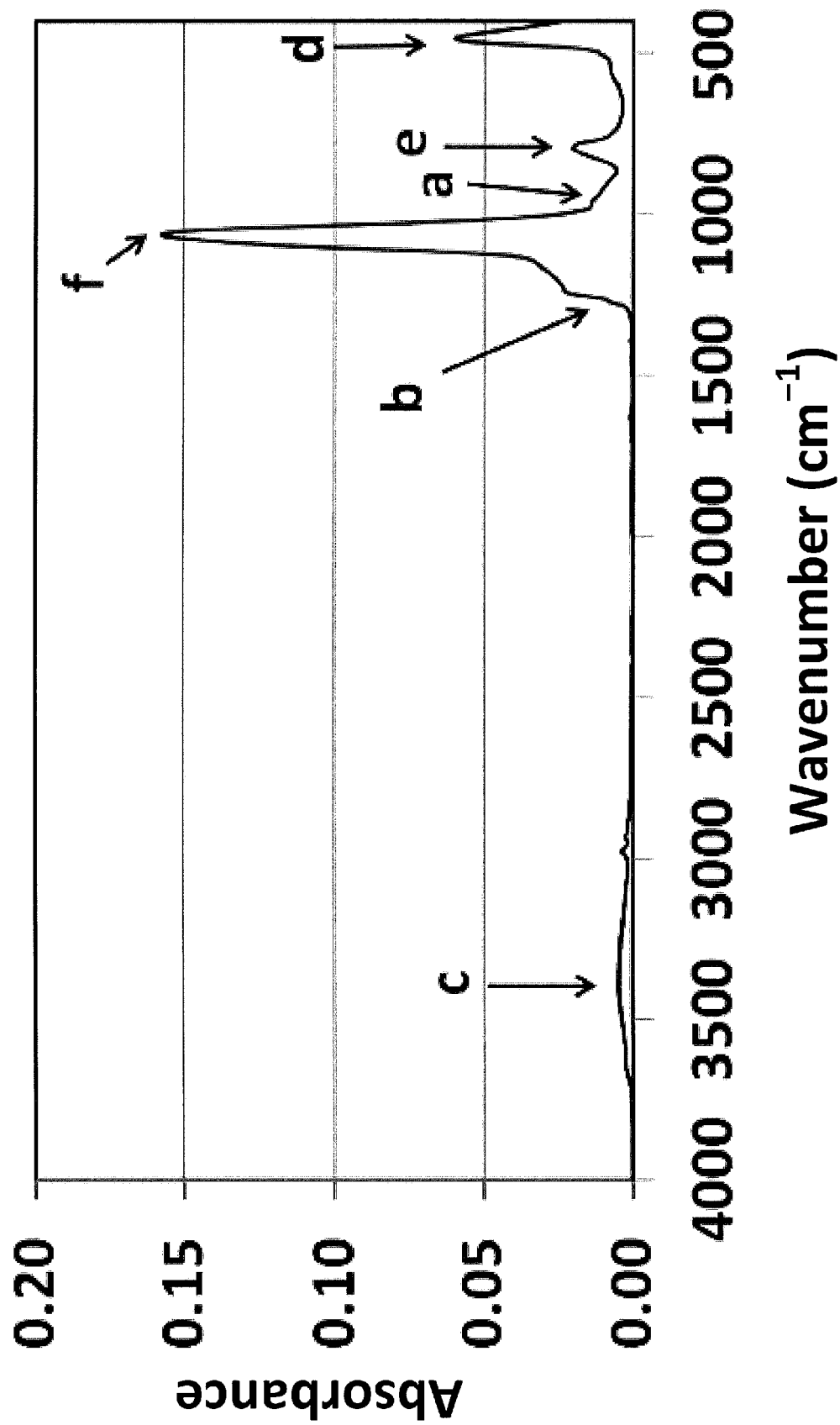
FIG. 9 is a graph showing an absorption spectrum obtained by ATR for a film according to Comparative Example 1.

Low refractive index films according to Examples and Comparative Example were measured for absorption spectra by ATR using a Fourier transform infrared spectrophotometer (manufactured by PerkinElmer, Inc., product name: Frontier Gold). The low refractive index films according to Examples and Comparative Example were measured for absorption spectra using 1 to 10 mg of powder specimens obtained by separating the low refractive index films formed on substrates in Examples and Comparative Example 1. The results for the absorption spectra of the low refractive index films according to Example 1 and Comparative Example 1 are shown in FIG. 8 and FIG. 9.

In the absorption spectra of the low refractive index films according to Examples and Comparative Example 1, the local maximum of absorbance in an absorption band derived from a hydrocarbon group ($CH_3$ and $CH_2$) not directly bonded to a silicon atom appeared in the wavenumber range of $910\pm50$ cm$^{-1}$. The local maximum of absorbance in an absorption band derived from a bond between a silicon atom and a methyl group appeared in the wavenumber range of $1276\pm50$ cm$^{-1}$. The local maximum of absorbance in an absorption band derived from a bond between a silicon atom and a hydroxy group appeared in the wavenumber range of $3438\pm50$ cm$^{-1}$. Moreover, the local maxima of absorbance in absorption bands derived from a bond (siloxane bond) between one oxygen atom and two silicon atoms appeared in the wavenumber ranges of $455\pm50$ cm$^{-1}$, $780\pm50$ cm$^{-1}$, and $1065\pm50$ cm$^{-1}$. In FIG. 8 and FIG. 9, the absorption band derived from the hydrocarbon group ($CH_3$ and $CH_2$) not directly bonded to a silicon atom is indicated by a symbol a, the absorption band derived from the bond between a silicon atom and a methyl group is indicated by a symbol b, the absorption band derived from the bond between a silicon atom and a hydroxy group is indicated by a symbol c, and the absorption bands derived from the bond between one oxygen atom and two silicon atoms are indicated by symbols d, e, and f in order from the short wavenumber side. In FIG. 8, the absorption band derived from the hydrocarbon group ($CH_3$ and $CH_2$) not directly bonded to a silicon atom and the absorption band derived from the bond between a silicon atom and a methyl group are enlarged in an enlarged view (1) and an enlarged view (2), respectively.

In each of the absorption spectra of the low refractive index films according to Examples and Comparative Example 1, an absorbance Ia derived from the hydrocarbon group ($CH_3$ and $CH_2$) not directly bonded to a silicon atom was determined in the following manner. In the absorption band derived from the hydrocarbon group ($CH_3$ and $CH_2$) not directly bonded to a silicon atom, a baseline was determined as shown in the enlarged view (1) in FIG. 8. An absorbance on the baseline and at the wavenumber where the local maximum of absorbance appeared was subtracted from the local maximum of absorbance to determine the absorbance Ia. In other words, when the local maximum of absorbance was expressed as $A_{max}$ ($CH_3$ and $CH_2$) and the absorbance on the baseline and at the wavenumber where the local maximum of absorbance appeared was expressed as an absorbance $A_{base}$ ($CH_3$ and $CH_2$), the absorbance Ia was determined by the following (Equation 5).

$Ia=A_{max}(CH_3 \text{ and } CH_2)-A_{base}(CH_3 \text{ and } CH_2)$ (Equation 5)

In each of the absorption spectra of the low refractive index films according to Examples and Comparative Example 1, an absorbance Ib derived from the bond (Si—$CH_3$) between a silicon atom and a methyl group was determined in the same manner as for the absorbance Ia. A baseline was determined as shown in the enlarged view (2) in FIG. 8. An absorbance on the baseline and at the wavenumber where the local maximum of the absorbance appeared was subtracted from the local maximum of absorbance to determine the absorbance Ib. In other words, when the local maximum of absorbance was expressed as $A_{max}$ (Si—$CH_3$) and the absorbance on the baseline and at the wavenumber where the local maximum of the absorbance appeared was expressed as $A_{base}$ (Si—$CH_3$), the absorbance Ib was determined by the following (Equation 6).

$Ib=A_{max}(Si-CH_3)-A_{base}(Si-CH_3)$ (Equation 6)

In each of the absorption spectra of the low refractive index films according to Examples and Comparative Example 1, the local maximum of absorbance in the absorption band derived from the bond (Si—OH) between a silicon atom and a hydroxy group was determined as an absorbance Ic derived from the bond. No correction using a baseline was performed when the absorbance Ic was determined.

In each of the absorption spectra of the low refractive index films according to Examples and Comparative Example 1, three local maxima of absorbance derived from the bond (Si—O—Si) between one oxygen atom and two silicon atoms were determined as a first absorbance Id, a second absorbance Ie, and a third absorbance If derived from the bond. As to the first absorbance Id, the second absorbance Ie, and the third absorbance If, the first absorbance Id corresponds to the smallest wavenumber, and the third absorbance If corresponds to the largest wavenumber. No correction using a baseline was performed also when the first absorbance Id, the second absorbance Ie, and the third absorbance If were determined.

For the low refractive index films according to Examples and Comparative Example 1, the inorganic-organic parameter (D), the hydrophobicity parameter (H), and the first to third network parameters (N1, N2, and N3) were determined by the following (Equation 7) to (Equation 11) based on the absorbance Ia, the absorbance Ib, the absorbance Ic, the first absorbance Id, the second absorbance Ie, and the third absorbance If determined as above. The results are shown in Table 1.

Inorganic-organic parameter $(D) = Ib/Ia$ (Equation 7)

Hydrophobicity parameter $(H) = Ib/Ic$ (Equation 8)

First network parameter $(N1) = Id/Ib$ (Equation 9)

Second network parameter $(N2) = Ie/Ib$ (Equation 10)

Third network parameter $(N3) = If/Ib$ (Equation 11)

[Evaluation of Film Formation Capability]

When each of the liquid compositions according to Examples and Comparative Example 1 was applied to a glass or polycarbonate substrate and at least one of the following cases was observed, the film formation capability of the liquid composition was rated as "x": the case where a portion of the glass or polycarbonate substrate was unable to be coated with the liquid composition; and the case where the resulting low refractive index film had a nonuniform thickness. When neither of the cases was observed, the film formation capability of the liquid composition was rated as "a". The results are shown in Table 1.

[Reflectance]

The spectral reflectance was measured with a spectrophotometer (manufactured by Hitachi High-Technologies Corporation, product name: U-4000) for each of antireflection structures according to Examples including a low refractive index film formed on a substrate. Based on the spectral reflectance, the reflectance (visible light reflectance) in the visible region (380 to 780 nm) was determined for the antireflection structure according to Japanese Industrial Standards (JIS) R 3106:1998.

Figure 10:
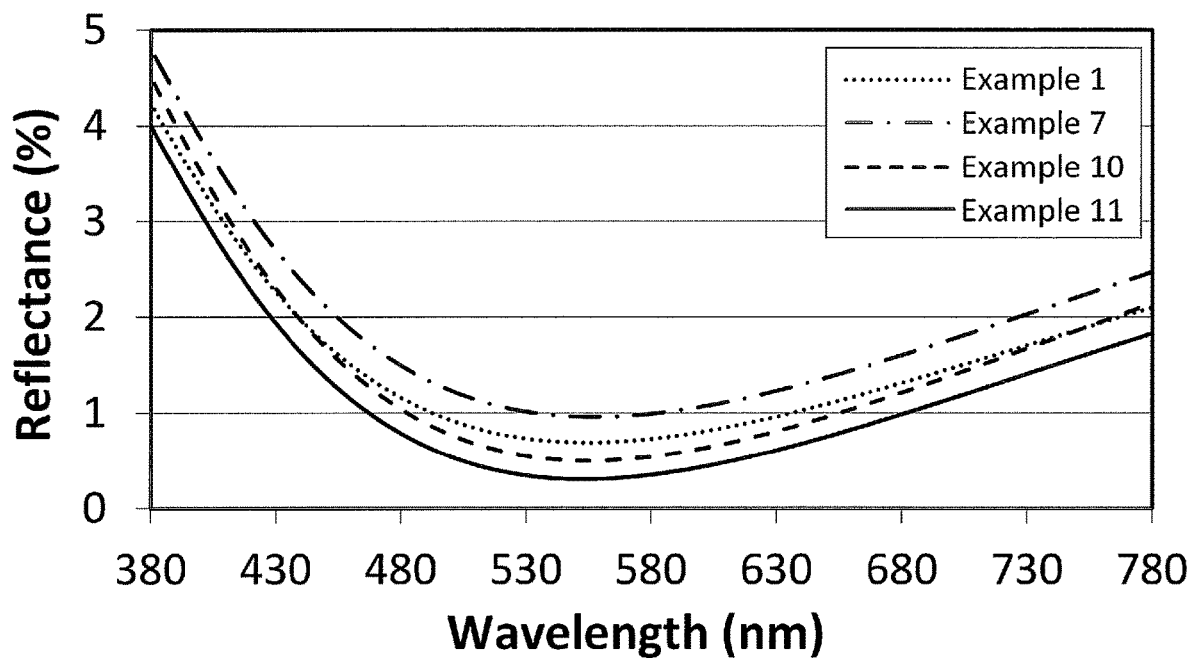
FIG. 10 is a graph showing reflection spectra of antireflection structures according to Examples 1, 7, 10, and 11.
Figure 11:
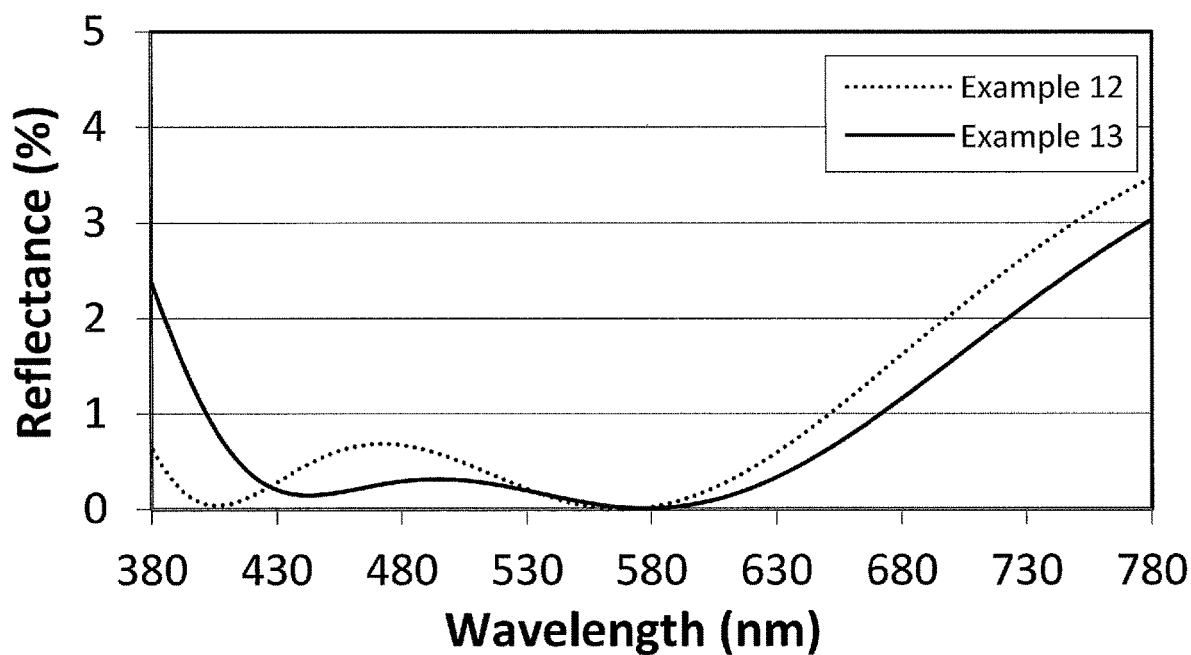
FIG. 11 is a graph showing reflection spectra of antireflection structures according to Examples 12 and 13.

The reflection angle was set to 120 in this spectral reflectance measurement. The spectral reflectances of the antireflection structures according to Examples 1, 7, 10, and 11 are shown in FIG. 10, and the spectral reflectance spectra of the antireflection structures according to Example 12 and Example 13 are shown in FIG. 11. The visible light reflectances of the antireflection structures according to Examples are shown in Table 1.

[Refractive Index]

Low refractive index films as formed in Examples were formed under the same conditions as in the production of the antireflection structures according to Examples, except for using a silicon substrate as a substrate. Refractive index measurement samples according to Examples were thus produced. The reflectances of the refractive index measurement samples according to Examples were measured using a spectrophotometer (manufactured by Hitachi High-Technologies Corporation, product name: U-4000), and the refractive indices of the low refractive index films according to Examples were determined by reflectance spectroscopy. The results are shown in Table 1.

Example 1

0.6 g of tetraethoxysilane (TEOS) (manufactured by Tokyo Chemical Industry Co., Ltd.), 1.18 g of methyltriethoxysilane (MTES) (manufactured by Tokyo Chemical Industry Co., Ltd.), 0.82 g of 0.3 wt % formic acid (manufactured by KISHIDA CHEMICAL Co., Ltd.), 3 g of a hollow silica particle sol (manufactured by JGC Catalyst and Chemicals Ltd., product name: THRULYA 4110, silica solids: about 25 wt %), and 22.4 g of ethanol (manufactured by KISHIDA CHEMICAL Co., Ltd.) were mixed and caused to undergo a reaction at 35° C. for 3 hours. A liquid composition according to Example 1 was thus obtained. As to the hollow silica particle sol, the hollow silica particles have an average particle diameter of about 50 nm, a shell made of silica has a thickness of 10 to 20 nm, the internal space of each hollow silica particle has a maximum dimension of about 10 to 30 nm, and the hollow silica particles have a refractive index of 1.25. The solids in the liquid composition according to Example 1 include 0.6 wt % of silica derived from TEOS, 1.6 wt % of polymethylsilsesquioxane derived from MTES, and 2.6 wt % of the hollow silica particles. The ratio of the amount of substance of MTES to the amount of substance of TEOS added to produce the liquid composition according to Example 1 was 7/3. The ratio of the weight of the hollow silica particles to the total solids weight of silica derived from TEOS and polymethylsilsesquioxane derived from MTES was 1.3/1.1.

A glass substrate (float glass; size: 40 mm×40 mm; thickness: 1 mm; refractive index: 1.52) was washed in ultrapure water for 15 minutes, in a commercially-available alkaline washing liquid for 15 minutes, and in ultrapure water for 15 minutes using an ultrasonic cleaner. The liquid composition according to Example 1 was applied by spin coating to both principal surfaces of the washed glass substrate. The resulting coating films had good appearance and were uniform immediately after the application. After that, the coating films were dried in an oven at 200° C. for 10 minutes to obtain low refractive index films according to Example 1. An antireflection structure according to Example 1, as shown in FIG. 2, including a glass substrate and low refractive index films formed on the glass substrate was thus obtained. The low refractive index films according to Example 1 were each confirmed to have a uniform thickness by observation of the appearance thereof. The low refractive index films according to Example 1 each had a thickness of 120 nm. The ratio of the amount of substance of polymethylsilsesquioxane to the amount of substance of silica was 7/3 in the binder of the low refractive index films according to Example 1.

Examples 2 to 5

Liquid compositions according to Examples 2 to 5 were obtained in the same manner as in Example 1, except that the ratio of the amount of substance of methyltriethoxysilane (MTES) to the amount of substance of tetraethoxysilane (TEOS) was adjusted as shown in Table 1 in preparation of the liquid compositions. Low refractive index films according to Examples 2 to 5 and antireflection structures according to Examples 2 to 5 were produced in the same manner as in Example 1, except that the liquid compositions according to Examples 2 to 5 were used instead of the liquid composition according to Example 1. The liquid compositions according to Examples 2 to 5 had good film formation capability.

Examples 6 to 9

Liquid compositions according to Examples 6 to 9 were obtained in the same manner as in Example 1, except that the ratio of the amount of substance of methyltriethoxysilane (MTES) to the amount of substance of tetraethoxysilane (TEOS) was adjusted as shown in Table 1 in preparation of the liquid compositions. Low refractive index films according to Examples 6 to 9 and antireflection structures according to Examples 6 to 9 were produced in the same manner as in Example 1, except that a polycarbonate (PC) substrate (size: 40 mm×40 mm; thickness: 1 mm; refractive index: 1.59) was used instead of the glass substrate and the liquid compositions according to Examples 6 to 9 were used instead of the liquid composition according to Example 1.

Examples 10 and 11

Particles having a core-shell structure were produced by forming a shell made of magnesium fluoride around a core made of silica. The silica cores of the particles were dissolved with an alkaline solution to produce hollow magnesium fluoride particles. The hollow magnesium fluoride particles have an average particle diameter of about 50 nm, the outer shell made of magnesium fluoride has a thickness of about 10 nm, the internal space has a maximum dimension of about 30 nm, and the hollow particles have a refractive index of 1.20. Liquid compositions according to Examples 10 and 11 were obtained in the same manner as in Example 1, except that the hollow magnesium fluoride particles were used instead of the hollow silica particles. Low refractive index films according to Example 10 and an antireflection structure according to Example 10 were produced in the same manner as in Example 1, except that the liquid composition according to Example 10 was used instead of the liquid composition according to Example 1. Low refractive index films according to Example 11 and an antireflection structure according to Example 11 were produced in the same manner as in Example 7, except that the liquid composition according to Example 11 was used instead of the liquid composition according to Example 7. The low refractive index films according to Example 10 and Example 11 each had a thickness of 118 nm.

Example 12

A composition for coating was prepared in the same manner as for the liquid composition according to Example 1, except that the hollow silica particle sol was not added. The composition for coating was applied by spin coating to both principal surfaces of an alkali-washed glass substrate (float glass; size: 40 mm×40 mm; thickness: 1 mm; refractive index: 1.52). Next, the coating films formed of the composition for coating was dried in an oven at 200° C. for 10 minutes to form inner low refractive index films. The inner low refractive index films each had a refractive index of 1.46 and a thickness of 260 nm. The liquid composition according to Example 1 was applied to the inner low refractive index films by spin coating. Next, the coating films formed of the liquid composition was dried in an oven at 200° C. for 10 minutes to form low refractive index films according to Example 12. An antireflection structure according to Example 12 as shown in FIG. 3A was thus produced. The low refractive index films according to Example 12 each had a thickness of 95 nm. The composition for coating had good film formation capability on the glass substrate, and the liquid composition according to Example 1 had good film formation capability on the inner low refractive index films.

Example 13

An antireflection structure according to Example 13 was produced in the same manner as in Example 12, except that the liquid composition according to Example 10 was used instead of the liquid composition according to Example 1. The liquid composition according to Example 10 had good film formation capability on the inner low refractive index films.

Example 14

Low refractive index films according to Example 14 and an antireflection structure according to Example 14 were produced in the same manner as in Example 1, except that the thickness of each low refractive index film was changed to 180 nm. The liquid composition according to Example 1 had good film formation capability also when each film was formed to have a thickness of 180 nm.

Example 15

The liquid composition as used in Example 1 was applied by spin coating to one principal surface of a glass substrate (float glass; size: 40 mm×40 mm; thickness: 1 mm; refractive index: 1.52) washed in the same manner as in Example 1, followed by drying in an oven at 200° C. for 10 minutes to form a low refractive index film having a thickness of 100 nm. Moreover, the liquid composition as used in Example 1 was applied by spin coating to the other principal surface of the glass substrate, followed by drying in an oven at 200° C. for 10 minutes to form a low refractive index film having a thickness of 180 nm. Low refractive index films according to Example 15 as shown in FIG. 2 and an antireflection structure according to Example 15 as shown in FIG. 2 were thus produced. The liquid composition according to Example 1 had good film formation capability also in this case.

Example 16

The liquid composition as used in Example 1 was applied by spin coating to both principal surfaces of a glass substrate (float glass; size: 40 mm×40 mm; thickness: 1 mm; refractive index: 1.52) washed in the same manner as in Example 1, followed by drying in an oven at 200° C. for 10 minutes to form third low refractive index films each having a thickness of 30 nm. Next, the composition for coating as used in Example 12 was applied by spin coating to the third low refractive index films, followed by drying in an oven at 200° C. for 10 minutes to form second low refractive index films each having a thickness of 40 nm. Moreover, the liquid composition according to Example 1 was applied by spin coating to the second low refractive index films, followed by drying in an oven at 200° C. for 10 minutes to form first low refractive index films each having a thickness of 30 nm. An antireflection structure according to Example 16 as shown in FIG. 3B was thus produced. The liquid composition according to Example 1 had good film formation capability on the glass substrate and the low refractive index films also in this case, and the composition for coating according to Example 12 had good film formation capability on the low refractive index films.

Comparative Example 1

A liquid composition according to Comparative Example 1 was obtained in the same manner as in Example 1, except that the ratio of the amount of substance of methyltriethoxysilane (MTES) to the amount of substance of tetraethoxysilane (TEOS) was adjusted as shown in Table 1 in preparation of the liquid composition. Low refractive index films according to Comparative Example 1 and an antireflection structure according to Comparative Example 1 were produced in the same manner as in Example 1, except that the liquid composition according to Comparative Example 1 was used instead of the liquid composition according to Example 1. Observation of the appearance of the low refractive index films according to Comparative Example 1 clearly confirmed that the low refractive index films each had a nonuniform thickness.

As shown in Table 1, the antireflection structures according to Examples 1 to 5 has a visible light reflectance of 1.6% or less. The antireflection structures according to Examples 6 to 9 has a visible light reflectance of 1.3% or less. The antireflection structures according to Examples 10 and 11 had a visible light reflectance of 1.1% or less. The antireflection structures according to Examples 12 and 13 has a visible light reflectance of 0.2% or less. It was thus confirmed that the antireflection structures according to Examples can exhibit high antireflection performance. As shown in FIG. 10, the antireflection structures according to Examples 1, 7, 10, and 11 has a spectral reflectance of 5% or less throughout the visible region (the wavelength range from 380 nm to 780 nm). As shown in FIG. 11, the antireflection structure according to Example 12 has a spectral reflectance of 4% or less throughout the visible region, and the antireflection structure according to Example 13 has a spectral reflectance of 3% or less throughout the visible region.

Figure 12:
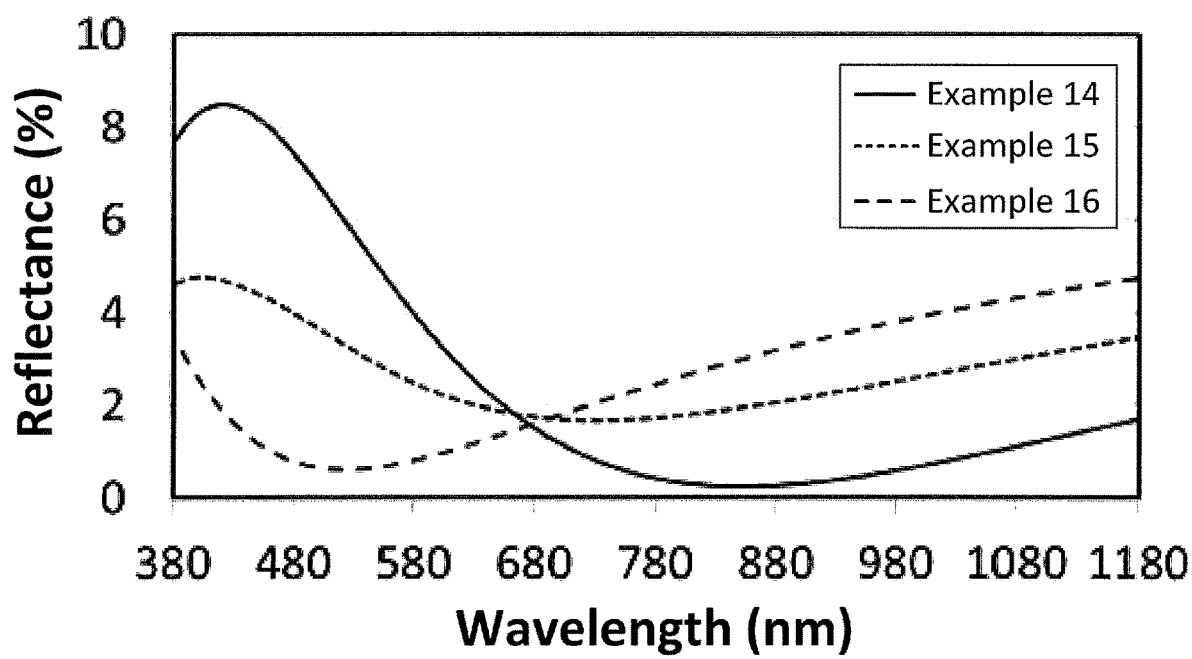
FIG. 12 is a graph showing reflection spectra of antireflection structures according to Examples 14, 15, and 16.

As shown in Table 1, the antireflection structure according to Example 14 has a visible light reflectance of 4.2%. As shown in FIG. 12, the antireflection structure according to Example 14 has a spectral reflectance of 8.5% or less throughout the visible region, an average spectral reflectance of 0.4% in the wavelength range of 800 nm to 1000 nm which is in the near-infrared region (the wavelength range of 800 nm to 2500 nm) and close to the visible region, and an average spectral reflectance of 0.6% in the wavelength range of 800 nm to 1100 nm.

As shown in Table 1, the antireflection structure according to Example 15 has a visible light reflectance of 2.3%. As shown in FIG. 12, the antireflection structure according to Example 15 has a spectral reflectance of 4.8% or less throughout the visible region, an average spectral reflectance of 2.2% in the wavelength range of 800 nm to 1000 nm which is in the near-infrared region and close to the visible region, and an average spectral reflectance of 2.4% in the wavelength range of 800 nm to 1100 nm.

As shown in Table 1, the antireflection structure according to Example 16 has a visible light reflectance of 0.7%. As shown in FIG. 12, the antireflection structure according to Example 16 has a spectral reflectance of 3.5% or less throughout the visible region, an average spectral reflectance of 3.3% in the wavelength range of 800 nm to 1000 nm which is in the near-infrared region and close to the visible region, and an average spectral reflectance of 3.6% in the wavelength range of 800 nm to 1100 nm.

TABLE 1

| | Substrate | Configuration of antireflection structure | Material of hollow particles | Amount-of-substance ratio between silane compounds | | Inorganic-organic parameter (D) | Hydrophobicity parameter (H) |
|---|---|---|---|---|---|---|---|
| | | | | MTES | TEOS | | |
| Example 1 | Glass | Single-layered | Silica | 7 | 3 | 1.1 | 0.6 |
| Example 2 | Glass | Single-layered | Silica | 5 | 5 | 1.5 | 0.5 |
| Example 3 | Glass | Single-layered | Silica | 10 | 0 | 1.2 | 1.2 |
| Example 4 | Glass | Single-layered | Silica | 9 | 1 | 1.0 | 1.6 |
| Example 5 | Glass | Single-layered | Silica | 3 | 7 | 0.7 | 0.3 |
| Example 6 | PC | Single-layered | Silica | 6 | 4 | 1.3 | 0.5 |
| Example 7 | PC | Single-layered | Silica | 8 | 2 | 1.2 | 0.8 |
| Example 8 | PC | Single-layered | Silica | 10 | 0 | 1.2 | 1.2 |
| Example 9 | PC | Single-layered | Silica | 4 | 6 | 1.7 | 0.5 |
| Example 10 | Glass | Single-layered | $MgF_2$ | 7 | 3 | 1.2 | 0.5 |
| Example 11 | PC | Single-layered | $MgF_2$ | 7 | 3 | 1.3 | 0.6 |
| Example 12 | Glass | Two-layered | Silica | 7 | 3 | 1.0 | 0.8 |
| Example 13 | Glass | Two-layered | $MgF_2$ | 7 | 3 | 1.2 | 0.6 |
| Example 14 | Glass | Single-layered | Silica | 7 | 3 | 1.1 | 0.7 |
| Example 15 | Glass | Single-layered | Silica | 7 | 3 | 1.1 | 0.7 |
| Example 16 | Glass | Three-layered | Silica | 7 | 3 | 1.2 | 0.8 |
| Comparative Example 1 | Glass | Single-layered | Silica | 2 | 8 | 0.5 | 0.2 |

| | First network parameter (N1) | Second network parameter (N2) | Third network parameter (N3) | Refractive index of low refractive index film | Film formation capability | Visible light reflectance [%] |
|---|---|---|---|---|---|---|
| Example 1 | 17 | 8 | 41 | 1.19 | a | 1.4 |
| Example 2 | 22 | 9 | 55 | 1.18 | a | 1.4 |
| Example 3 | 7 | 6 | 11 | 1.20 | a | 1.6 |
| Example 4 | 9 | 6 | 18 | 1.20 | a | 1.5 |
| Example 5 | 60 | 20 | 174 | 1.18 | a | 1.5 |
| Example 6 | 20 | 9 | 48 | 1.19 | a | 1.2 |
| Example 7 | 17 | 8 | 25 | 1.19 | a | 1.2 |
| Example 8 | 7 | 6 | 11 | 1.19 | a | 1.1 |
| Example 9 | 27 | 10 | 67 | 1.18 | a | 1.3 |
| Example 10 | 18 | 9 | 43 | 1.17 | a | 0.8 |
| Example 11 | 16 | 9 | 41 | 1.17 | a | 1.1 |
| Example 12 | 17 | 8 | 40 | 1.19 | a | 0.2 |
| Example 13 | 19 | 8 | 42 | 1.17 | a | 0.2 |
| Example 14 | 19 | 8 | 46 | 1.19 | a | 4.2 |
| Example 15 | 18 | 8 | 44 | 1.19 | a | 2.3 |
| Example 16 | 19 | 9 | 47 | 1.19 | a | 0.7 |
| Comparative Example 1 | 73 | 22 | 196 | — | x | 5.3 |

The invention claimed is:

1. A laminate comprising:

a substrate; and at least two selected from the group consisting of a first layer, a second layer, and a third layer, the first layer having a thickness of 30~300 nm and refractive index of 1.5 or less, the first layer including:

a hollow particle that includes a material with a refractive index of 1.15~2.70; and a polysilsesquioxane, the second layer having a thickness of 30~300 nm and refractive index of more than 1.5 and 1.8 or less, the second layer including alumina or a mixture of silica and titania, the third layer having a thickness of 30~300 nm and refractive index of more than 1.8, the third layer including at least one selected from the group consisting of titania, zirconia, tantalum oxide and niobium oxide.

2. The laminate according to claim 1, the laminate having a structure selected from the group consisting of following (I), (II), (III) and (IV):
(I) a structure comprising, in sequence: the substrate; the third layer; and the first layer,
(II) a structure comprising, in sequence: the substrate; the second layer; the third layer; and the first layer,
(III) a structure comprising, in sequence: the substrate; and a structure in which the third layer and the first layer on the third layer are repeated m times, m being an integer of 2 or more,
(IV) a structure comprising, in sequence: the substrate; the first layer; and a structure in which the third layer and the first layer on the third layer are repeated n times, n being an integer of 1 or more.

3. The laminate according to claim 1, wherein the first layer has an absorbance spectrum capable of being measured by an attenuated total reflection method, and
the absorbance spectrum includes:
an absorbance of Ia determined based on a local maximum absorbance in an absorption band derived from a hydrocarbon group not directly bonded to a silicon atom,
an absorbance of Ib determined based on a local maximum absorbance in an absorption band derived from a bond between a silicon atom and a non-reactive functional group, and
an absorbance of Ic determined based on a local maximum of absorbance in an absorption band derived from a bond between a silicon atom and hydroxy group,
wherein at least one requirement selected from the group consisting of Ib/Ia≥0.7 and Ib/Ic≥0.3 is satisfied.

4. The laminate according to claim 3, wherein Ib/Ia≥0.7 and Ib/Ic≥0.3 are satisfied.

5. The laminate according to claim 3, the absorbance spectrum further having a first absorbance Id, a second absorbance Ie, and a third absorbance If,
the first absorbance Id, the second absorbance Ie, and the third absorbance If each derived from a bond between an oxygen atom and two silicon atom,
the first absorbance being at a first wavenumber,
the second absorbance being at a second wavenumber larger than the first wavenumber,
the third absorbance being at a third wavenumber larger than the second wavenumber,
wherein at least one requirement selected from the group consisting of Id/Ib≤60, Ie/Ib≤20, and If/Ib≤174 is satisfied.

6. The laminate according to claim 5, wherein Id/Ib≤60, Ie/Ib≤20, and If/Ib≤174 are satisfied.

7. The laminate according to claim 1, wherein the polysilsesquioxane has a hydrocarbon group with 16 or less carbon atoms, the hydrocarbon group bonds to a silicon atom.

8. The laminate according to claim 1, wherein the hollow particle has an average particle diameter of 10~150 nm.

9. The laminate according to claim 1, wherein the hollow particle includes one selected from the group consisting of silica, magnesium fluoride, alumina, aluminosilicate, titania, and zirconia.

10. A laminate comprising:
a substrate;
a first layer;
a second low-refractive-index layer; and
a third low-refractive index layer,
the first layer having a thickness of 30~300 nm and refractive index of 1.5 or less, the first layer including:
a hollow particle that includes a material with a refractive index of 1.15~2.70; and
a polysilsesquioxane,
the second layer having a thickness of 30~300 nm and a refractive index of 1.5 or less, the second layer including at least one selected from the group consisting of polysilsesquioxane and silica,
the third layer having a thickness of 30~300 nm and a refractive index of 1.5 or less.

11. The laminate according to claim 10, the laminate having a structure selected from the group consisting of following (i) and (ii):
(i) a structure comprising, in sequence: the substrate; the second low-refractive-index layer; and the first layer,
(ii) a structure comprising, in sequence; the substrate; the third low-refractive-index layer; the second low-refractive-index layer; and the first layer.

12. The laminate according to claim 10, wherein the first layer has an absorbance spectrum capable of being measured by an attenuated total reflection method, and
the absorbance spectrum includes:
an absorbance of Ia determined based on a local maximum absorbance in an absorption band derived from a hydrocarbon group not directly bonded to a silicon atom,
an absorbance of Ib determined based on a local maximum absorbance in an absorption band derived from a bond between a silicon atom and a non-reactive functional group, and
an absorbance of Ic determined based on a local maximum of absorbance in an absorption band derived from a bond between a silicon atom and hydroxy group,
wherein at least one requirement selected from the group consisting of Ib/Ia≥0.7 and Ib/Ic≥0.3 is satisfied.

13. A method for producing the laminate according to claim 1, the method comprising:
hardening a first liquid composition to form the first layer, the first liquid composition including an organosilane compound so that a molar ratio of silica to polysilsesquioxane is 0 to 7/3.

14. A method for producing the laminate according to claim 10, the method comprising:
hardening a first liquid composition to form the first layer, the first liquid composition including an organosilane compound so that a molar ratio of silica to polysilsesquioxane is 0 to 7/3.

15. An optical element comprising the laminate according to claim 1.

16. A lens comprising the laminate according to claim 1.

17. An optical element comprising the laminate according to claim 10.

18. A lens comprising the laminate according to claim 10.

* * * * *